US012173839B2

(12) United States Patent
Wang et al.

(10) Patent No.: US 12,173,839 B2
(45) Date of Patent: Dec. 24, 2024

(54) ROTATABLE-SHOOTING LIVE-STREAMING PLATFORM

(71) Applicant: SHENZHEN NEEWER TECHNOLOGY CO. LTD, Shenzhen (CN)

(72) Inventors: Jun Wang, Shenzhen (CN); Yan Ke, Shenzhen (CN)

(73) Assignee: SHENZHEN NEEWER TECHNOLOGY CO. LTD, Shenzhen (CN)

( * ) Notice: Subject to any disclaimer, the term of this patent is extended or adjusted under 35 U.S.C. 154(b) by 0 days.

(21) Appl. No.: 18/312,398

(22) Filed: May 4, 2023

(65) Prior Publication Data

US 2024/0328570 A1    Oct. 3, 2024

(30) Foreign Application Priority Data

Mar. 31, 2023 (CN) .......................... 202320785387.0

(51) Int. Cl.
*F16M 11/20* (2006.01)
*F16M 11/04* (2006.01)
*F16M 11/22* (2006.01)
*G03B 15/07* (2021.01)

(52) U.S. Cl.
CPC ..... *F16M 11/2014* (2013.01); *F16M 11/2021* (2013.01); *F16M 11/22* (2013.01); *G03B 15/07* (2013.01); *F16M 11/04* (2013.01); *F16M 2200/08* (2013.01)

(58) Field of Classification Search
CPC ........... F16M 11/2014; F16M 11/2021; F16M 11/22; F16M 11/04; F16M 2200/08; G03B 15/07
See application file for complete search history.

(56) References Cited

U.S. PATENT DOCUMENTS

| 5,161,768 | A  | * | 11/1992 | Sarabin | ................. | A47G 33/12 |
| | | | | | | 248/188.7 |
| 9,641,730 | B2 | * | 5/2017 | Rosenberry | ............ | F16M 13/00 |
| 11,665,306 | B1 | * | 5/2023 | Hou | ........................ | G03B 37/02 |
| | | | | | | 348/40 |

(Continued)

FOREIGN PATENT DOCUMENTS

CN             218327240 U        1/2023

OTHER PUBLICATIONS

First Office Action issued in counterpart Chinese Patent Application No. 202320785387.0, dated Sep. 13, 2023.

(Continued)

*Primary Examiner* — Anita M King
(74) *Attorney, Agent, or Firm* — Westbridge IP LLC

(57) ABSTRACT

Disclosed is a rotatable-shooting live-streaming platform, including a stand platform and a bracket assembly. The stand platform includes a base and a plate provided above the base; and the bracket assembly includes an auxiliary bracket rotatably connected to the stand platform around a vertical axis, and the auxiliary bracket is provided with an equipment-installation structure for installing a supplementary light and/or a shooting equipment. The technical solution of the present disclosure enables the live-streaming platform to shoot the items and the models on the plate stably in multiple directions, which enriches the live-streaming effect.

7 Claims, 6 Drawing Sheets

(56) References Cited

U.S. PATENT DOCUMENTS 11,720,000 B1 * 8/2023 Huang ................. G03B 17/561
                                                      362/8
11,852,955 B2 * 12/2023 Zhang ................. G03B 17/561

OTHER PUBLICATIONS

Grant Notification issued in counterpart Chinese Patent Application No. 202320785387.0, dated Nov. 23, 2023.

* cited by examiner

ROTATABLE-SHOOTING LIVE-STREAMING PLATFORM

CROSS-REFERENCE TO RELATED APPLICATIONS

This application claims priority to Chinese Application No. 202320785387.0, filed on Mar. 31, 2023, the entire disclosure of which is incorporated herein by reference.

TECHNICAL FIELD

The present disclosure relates to the technical field of live-streaming equipment, in particular to a rotatable-shooting live-streaming platform.

BACKGROUND

With the rise of the live-streaming industry, it is often necessary to use a live-streaming platform to show items during the live-streaming process for publicizing to the consumers. In the process of publicizing items, lighting and shooting equipment are required to illuminate and show the items from multiple angles, so that the audience can better understand the characteristics of the product. Therefore, a live-streaming equipment that can circumferentially display platform is needed. The streamer can freely adjust the shooting position without shaking the camera and affecting the live-streaming effect.

SUMMARY

The main objective of the present disclosure is to provide a rotatable-shooting live-streaming platform, aiming to enable the live-streaming platform to steadily shoot the items or models on the plate in multiple directions, and enrich the streaming effect.

To achieve the above objective, the present disclosure provides a rotatable-shooting live-streaming platform, including: a stand platform and a bracket assembly.

The stand platform includes a base and a plate provided above the base.

The bracket assembly includes an auxiliary bracket.

The auxiliary bracket is rotatably connected to the stand platform around a vertical axis, and the auxiliary bracket is provided with an equipment-installation structure for installing a supplementary light and/or a shooting equipment.

In an embodiment, the bracket assembly further includes an angle adjuster and a crossbeam, the crossbeam is rotatably connected to the stand platform around the vertical axis, the auxiliary bracket is connected to an end of the crossbeam away from the base, the auxiliary bracket is rotatably connected to the crossbeam around a horizontal axis, and the angle adjuster is configured to adjust an angle between the auxiliary bracket and the crossbeam.

In an embodiment, the angle adjuster includes a support member, a sliding member hinged to the support member, the crossbeam is hinged to the auxiliary bracket, the support member is provided on a side of the auxiliary bracket close to the plate and is rotatable relative to the crossbeam and the auxiliary bracket, and the sliding member is slidable on the crossbeam and/or the auxiliary bracket to adjust the angle between the auxiliary bracket and the crossbeam.

In an embodiment, the live-streaming platform includes two sliding members, the two sliding members are hinged to two opposite ends of the support member respectively, one of the two sliding members is provided on the crossbeam, and the other of two sliding members is provided on the auxiliary bracket.

In an embodiment, the live-streaming platform includes one sliding member, the sliding member is hinged to an end of the support member and is slidably provided on one of the crossbeams and the auxiliary bracket, another end of the support member is hinged to the other of the crossbeams and the auxiliary bracket.

In an embodiment, the sliding member includes a sleeve and a locking member, the sleeve is slidably sleeved on the auxiliary bracket and/or the crossbeam, the locking member is configured to fix the sleeve relative to the auxiliary bracket.

In an embodiment, the sleeve includes a tube part with an opening on a side of the tube part, and two opposite installation parts provided on an edge of the opening, one of the two installation parts is provided with a threaded hole, the other of two installation parts is provided with an installation through hole, the locking member is configured to be a bolt, and one end of the bolt is passed through the installation through hole and threaded to the threaded hole.

In an embodiment, a hinge hole is provided at an end of each installation part close to the support member, an end surface of the support member is protruded with a hinge protrusion, the hinge protrusion is inserted into an interval between the two installation parts and is hinged to the hinge hole.

In an embodiment, the crossbeam is provided with an installation groove, an end of the support member is inserted into the installation groove and is hinged to two side walls of the installation groove.

In an embodiment, an end of the auxiliary bracket is inserted into the installation groove and is hinged to the two side walls of the installation groove.

In an embodiment, the crossbeam includes two parallel cross-rods and an installation base provided on the two cross-rods, the installation base is connected to one end of each of the two cross-rods, the installation groove is provided on the installation base.

In the technical solution of the present disclosure, the shooting equipment provided on the auxiliary bracket can circumferentially shoot the items or models on the platform by rotating the auxiliary bracket around the plate, the shooting angle during the live-streaming is enlarged, the streaming effect is enriched, and the convenience of the shooting is improved.

BRIEF DESCRIPTION OF THE DRAWINGS

In order to more clearly illustrate the technical solutions in the embodiments of the present disclosure or in the related art, drawings used in the embodiments or in the related art will be briefly described below. Obviously, the drawings in the following description are only some embodiments of the present disclosure. It will be apparent to those skilled in the art that other figures can be obtained according to the structures shown in the drawings without creative work.

Figure 1:
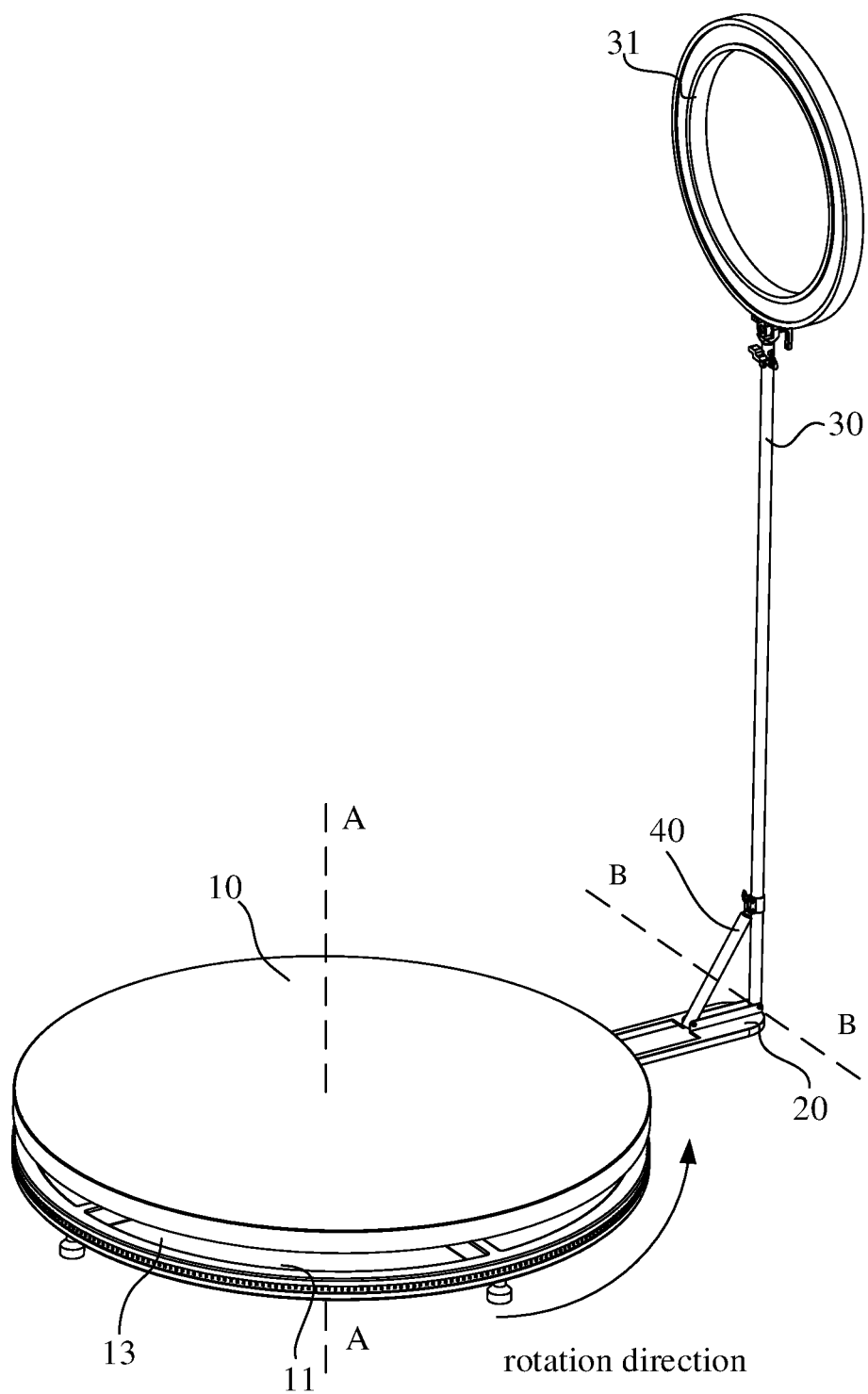
FIG. 1 is a schematic structural view of a rotatable-shooting live-streaming platform according to an embodiment of the present disclosure.

The realization of the objective, functional characteristics, and advantages of the present disclosure are further described with reference to the accompanying drawings.

DETAILED DESCRIPTION OF THE EMBODIMENTS

The technical solutions in the embodiments of the present disclosure will be clearly and completely described below with reference to the drawings in the embodiment of the present disclosure. Obviously, the described embodiments are only a part of the embodiments of the present disclosure, not all of the embodiments. Based on the embodiments in the present disclosure, all other embodiments perceived by those ordinary skills in the art without creative effort should be fallen within the protection scope of the present disclosure.

It should be noted that all of the directional instructions in the embodiments of the present disclosure (such as, up, down, left, right, front, rear . . . ) are only used to explain the relative position relationship and movement of each component under a specific attitude (as shown in the drawings), if the specific attitude changes, the directional instructions will change correspondingly.

In the present disclosure, unless otherwise specified and limited, the terms "connection" and "fixation" should be understood in a broad sense, for example, "fixation" can be a fixed connection, a detachable connection, or an integration; it may be a mechanical connection or an electrical connection; it may be a direct connection or an indirect connection through an intermediary, and it may be an internal communication between two elements or an interaction relationship between two elements, unless otherwise clearly defined. Those of ordinary skill in the art can understand the specific meanings of the above terms in the present disclosure according to specific situations.

Besides, the descriptions in the present disclosure that refer to "first," "second," etc. are only for descriptive purposes and are not to be interpreted as indicating or implying relative importance or to implicitly indicate the number of technical features indicated. Thus, a feature defined as "first" or "second" may explicitly or implicitly include at least one of the features. In addition, technical solutions among the embodiments can be combined with each other, but must be based on the realization of the technical solutions by those skilled in the art, and when the technical solutions are contradictory to each other or cannot be realized, the technical solutions should be considered that the combination does not exist, and the technical solutions are not fallen within the protection scope claimed in the present disclosure.

With the rise of the live-streaming industry, it is often necessary to use a live-streaming platform to show items during the live-streaming process for publicizing to the consumers. In the process of publicizing items, lighting and shooting equipment are required to illuminate and show the items from multiple angles, so that the audience can better understand the characteristics of the product. Therefore, a live-streaming equipment that can circumferentially display platform is needed. The streamer can freely adjust the shooting position without shaking the camera and affecting the live-streaming effect.

The present disclosure provides a rotatable-shooting live-streaming platform.

In the embodiments of the present disclosure, the rotatable-shooting live-streaming platform shown in FIG. 1 to FIG. 6, including: a stand platform 10 and a bracket assembly 3.

The stand platform 10 includes a base 11 and a plate 12 provided above the base 11.

The bracket assembly 3 includes an auxiliary bracket 30.

The auxiliary bracket 30 is rotatably connected to the stand platform 10 around a vertical axis, and the auxiliary bracket 30 is provided with an equipment-installation structure for installing a supplementary light and/or a shooting equipment.

In the technical solution of the present disclosure, the auxiliary bracket 30 is rotated around the plate 12, so that the shooting equipment provided on the auxiliary bracket 30 can circumferentially shoot the items or models on the stand platform 10, the shooting angle during the streaming is enlarged, the streaming effect is enriched, and the convenience of the shooting is improved. In another equivalent embodiment, the plate 12 can be rotated, the auxiliary bracket 30 is stationary, which can also realize that the plate 12 is rotatable relative to the auxiliary bracket 30.

It should be noted that, a rotation direction of the auxiliary bracket 30 relative to the plate 12 is shown in FIG. 1, and the vertical axis is a center axis for the auxiliary bracket 30 rotating around the plate 12, or a center axis around by the plate 12 to rotate relative to the auxiliary bracket 30, the center axis is shown as the axis A in FIG. 1.

Figure 2:
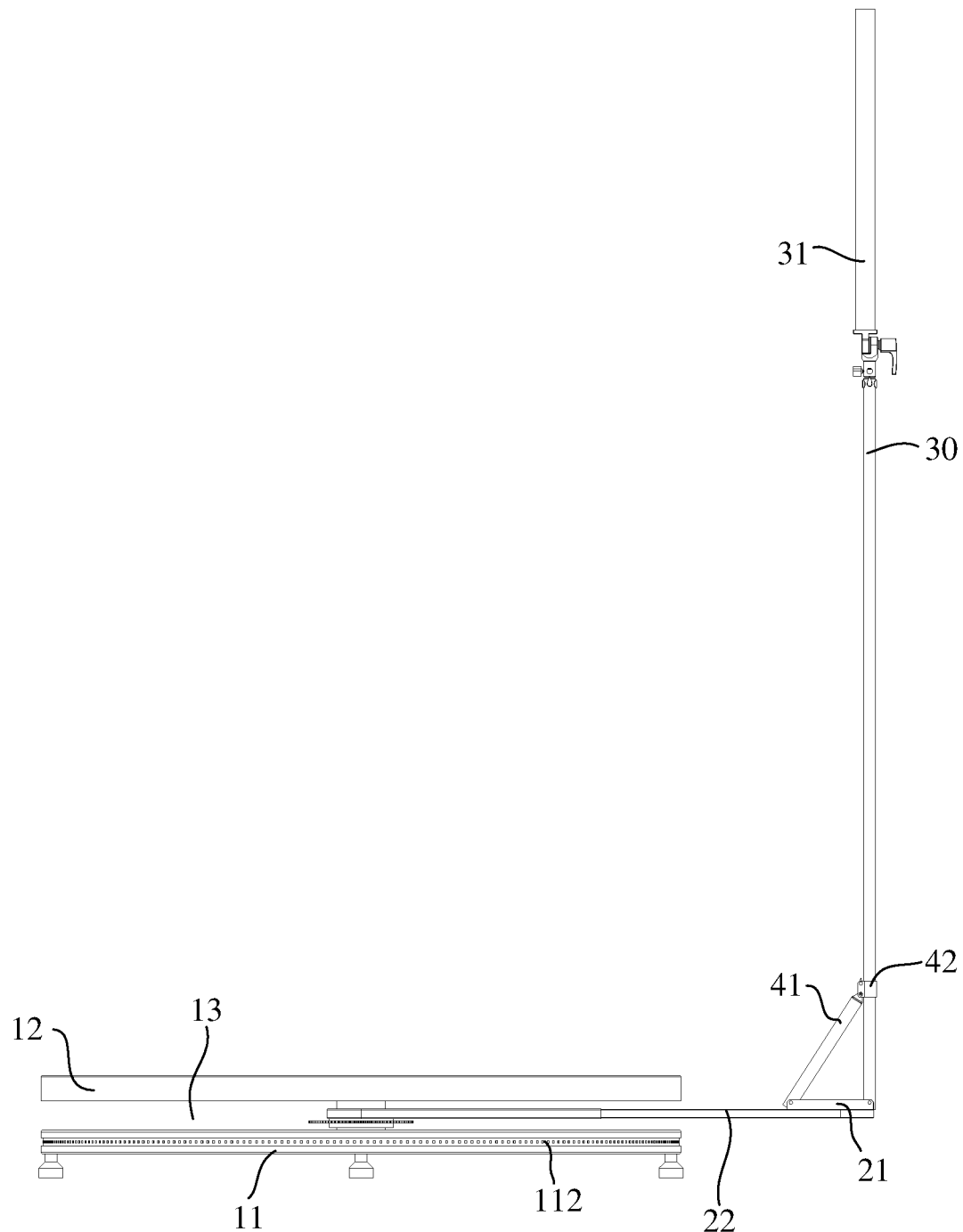
FIG. 2 is a side view according to the embodiment shown in FIG. 1.
Figure 3:
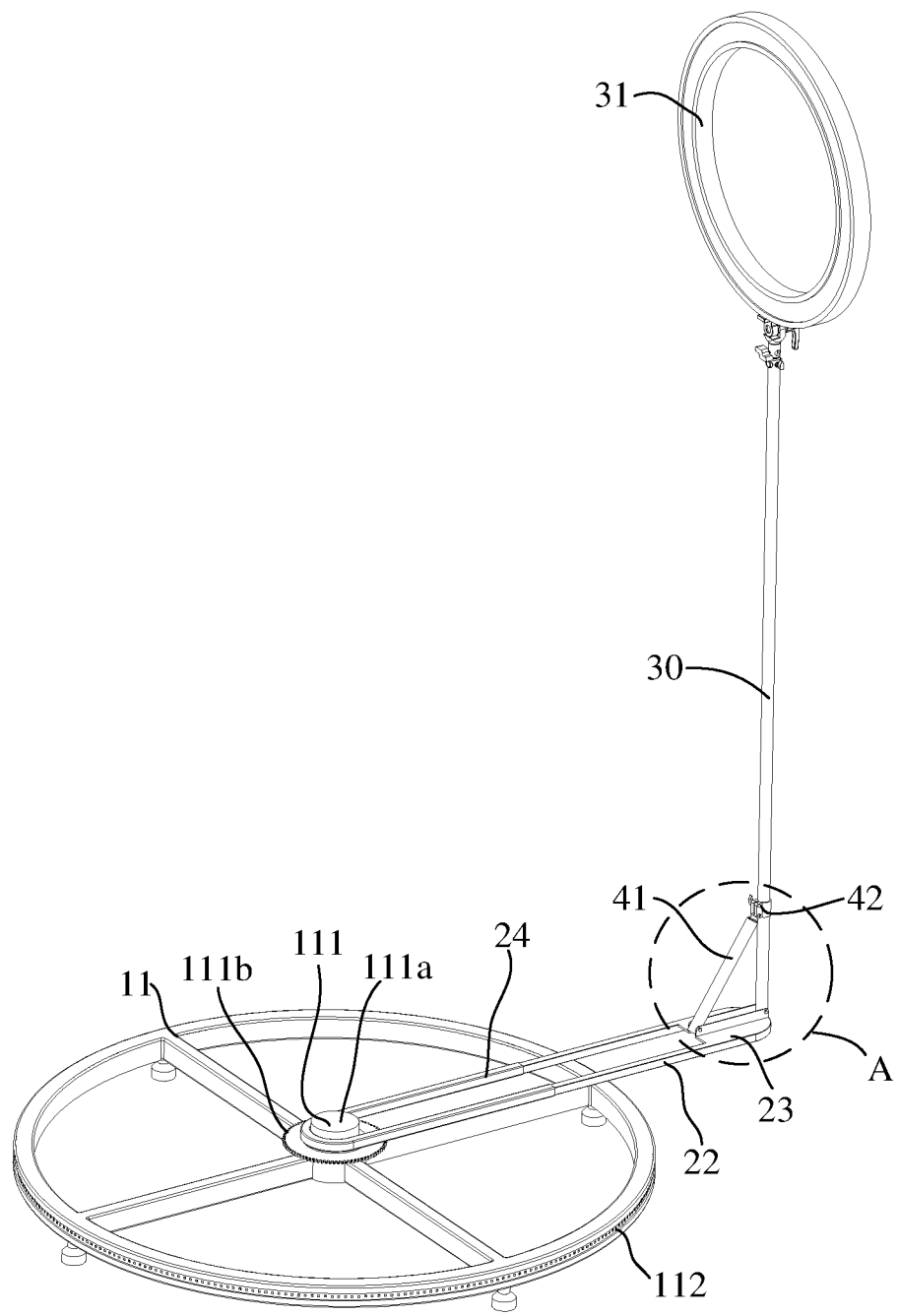
FIG. 3 is another schematic structural view according to the embodiment shown in FIG. 1.
Figure 4:
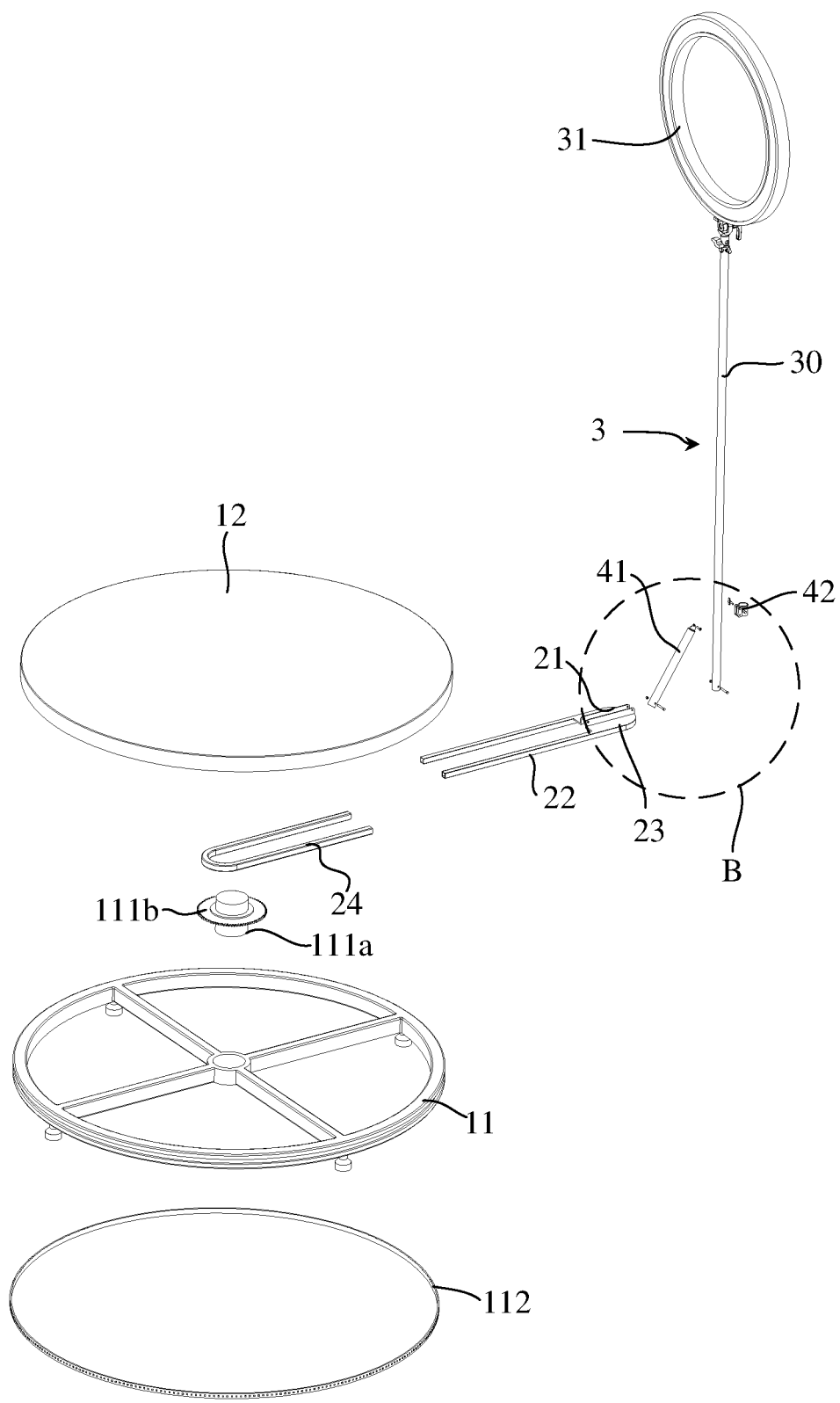
FIG. 4 is an exploded view according to the embodiment shown in FIG. 1.
Figure 5:
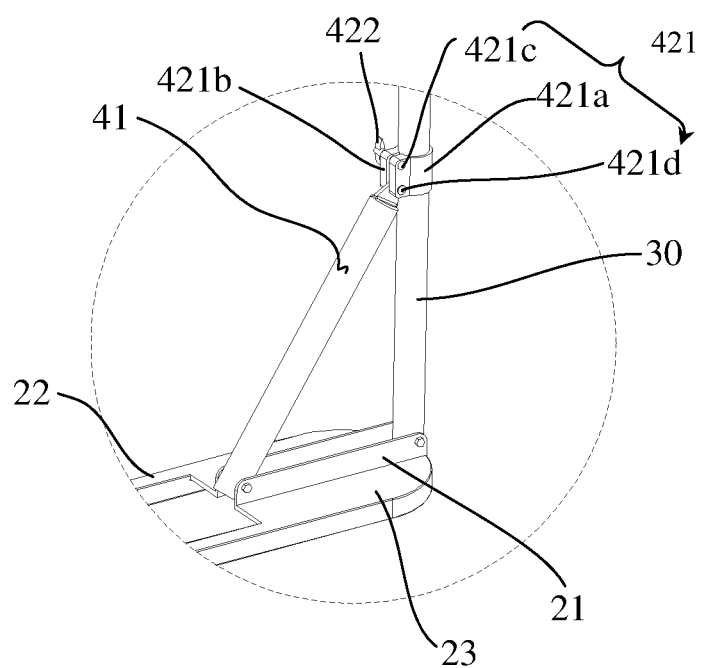
FIG. 5 is a partial enlarged view at A position in FIG. 3.
Figure 6:
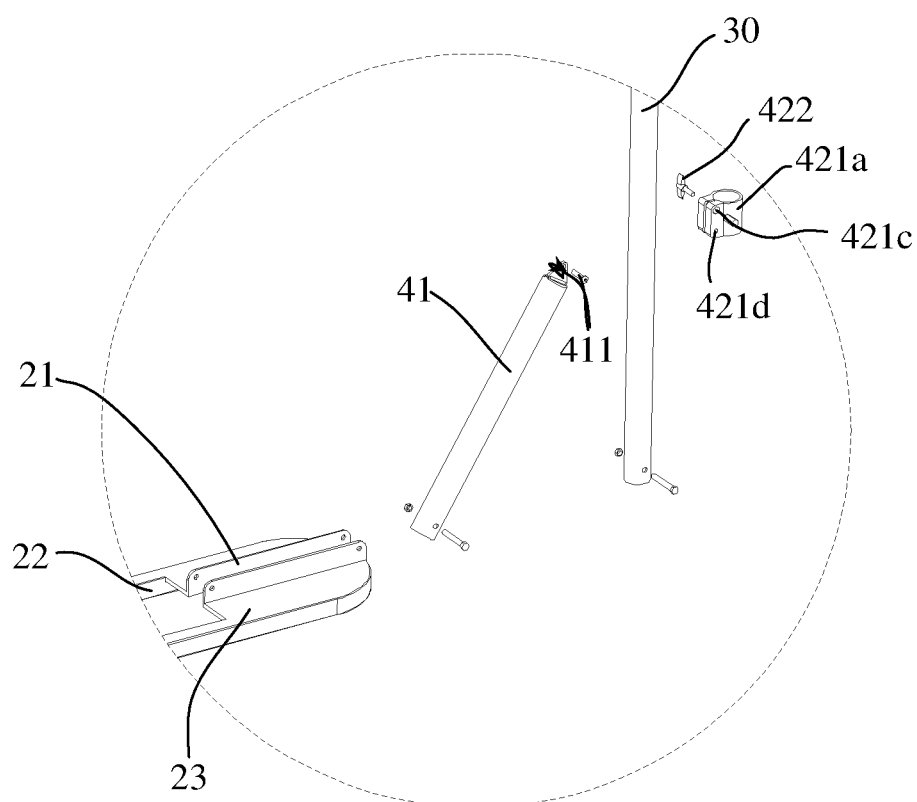
FIG. 6 is a partial enlarged view at B position in FIG. 4.

As shown in FIG. 1 to FIG. 3, in order to realize the relative rotation of the auxiliary bracket 30 around the plate 12, the stand platform 10 further includes a shaft 111 and a motor (not shown in the figure) for driving the shaft 111 to rotate, the shaft 111 includes a support main shaft 111a and a gear plate 111b, the gear plate 111b is driven by the motor to rotate, two ends of the support main axis are rotatably installed on the base 11 and the center of the plate 12. When the base 11 is placed on the ground, the plate 12 is supported by the support main shaft 111a, to form an interval gap 13 between the base 11 and the plate 12. A bottom of the auxiliary bracket 30 is extended into the interval gap 13 and is fixedly installed on the gear plate 111b. An output shaft of the motor is provided with the gear meshing with the gear plate 111b, the gear plate 111b is fixedly connected to the support main shaft 111a. When in use, the motor drives the gear plate 111b to rotate through the gear, to drive the auxiliary bracket 30 fixedly installed on the gear plate 111b to rotate around the axis A of the plate 12. In some embodiments, the support main shaft 111a may be configured to a fixed shaft, that is, when the base 11 is placed on the ground, the plate 12 is supported by the support main shaft 111a, to form the interval gap 13 between the base 11 and the plate 12. The gear plate 111b is rotatably installed on the support main shaft 111a. The gear plate 111b is driven to rotate to make the auxiliary bracket 30 to rotate around the plate 12. In other embodiment, the plate 12 may be rotatably installed on the support main shaft 111a, and the gear plate 111b rotatably installed on the support main shaft 111a is fixed to the plate 12, the output shaft of motor is provided with the gear meshed with the gear plate 111b, to drive the plate 12, and then the auxiliary bracket 30 is stationary.

In some embodiments, the bracket assembly 3 further includes a crossbeam 20, one end of the crossbeam 20 is extended into the interval gap 13 and is connected to the gear plate 111b, another end of the crossbeam 20 is stayed outside the interval gap to be connected to the auxiliary bracket 30, the gear plate 111b is rotated to drive the crossbeam 20 to rotate around the axis A of the plate 12, to drive the auxiliary bracket 30 to rotate around the plate 12. In other embodiments, the bracket assembly 3 may exclude the crossbeam 20.

In some embodiments, the bracket assembly 3 further includes an angle adjuster 40 and a crossbeam 20 hinged to the auxiliary bracket 30, the angle adjuster 40 may adjust the angle between the auxiliary bracket 30 and the crossbeam 20, so that the auxiliary bracket 30 is fixed relative to and the crossbeam 20. The auxiliary bracket 30 is driven by the crossbeam 20 to rotate around the stand platform 10, so that the shooting equipment provided on the auxiliary bracket 30 may circumferentially shoot the items or models on the stand platform 10. The angle adjuster 40 is used to adjust the angle between the auxiliary bracket 30 and the crossbeam 20 to adjust the angle or the distance of the shooting equipment provided on the auxiliary bracket 30 relative to the items or models on the stand platform 10, so that the supplementary light and/or the shooting equipment may show products in multiple angles. In other embodiments, there maybe no the angle adjuster 40, the crossbeam 20 and the auxiliary bracket 30 are fixed, and the angle between the crossbeam 20 and the auxiliary bracket 30 is rectangle.

As shown in FIG. 2 to FIG. 6, in some embodiments, the angle adjuster 40 includes a support member 41 and a sliding member 42. There is one sliding member 42, that is, the sliding member 42 is hinged to an end of the support member 41, and is slidably provided on one of the crossbeams 20 and the auxiliary bracket 30, another end of the support member 41 is hinged to the rest of the crossbeam 20 and the auxiliary bracket 30. Specifically, when the sliding member 42 is slidably provided on the auxiliary bracket 30, one end of the support member 41 is hinged to the crossbeam 20, another end of the support member 41 is hinged to the sliding member 42, one end of the auxiliary bracket 30 opposite to the end for installing the shooting equipment is hinged to an end of the crossbeam 20 exposed to the interval gap 13, the sliding member 42 is slidably installed on the auxiliary bracket 30. When the auxiliary bracket 30 normally supports the shooting equipment, the support member 41, part of the auxiliary bracket 30 and part of the crossbeam 20 enclose to form a triangle, which is shown as FIG. 1.

In other embodiments, the angle adjuster 40 includes an angle-adjusting plate provided with a plurality of adjusting holes, the plurality of adjusting holes are distributed at intervals in a circumferential direction of the angle-adjusting plate, an inner of the angle-adjusting plate is rotatably connected to the auxiliary bracket 30, two sides of the bottom of the auxiliary bracket 30 are provided with a through hole, screws are provided inside the adjusting hole and the through holes, and the user may adjust and fix the angle of the bending rod by the screws.

In some embodiments, the sliding member 42 includes a locking member 422, when the sliding member 42 is slidably provided on the auxiliary bracket 30, the locking member 422 is configured to lock a position of the sliding member 42 on the auxiliary bracket 30, as shown in FIG. 1. When the angle between the auxiliary bracket 30 and the crossbeam 20 needs to be adjusted, that is, when an inclined angle of the auxiliary bracket 30 relative to the plate 12 needs to be adjusted, the locking member 422 is loosened, so that the sliding member 42 maybe slide freely on the auxiliary bracket 30. Then the auxiliary bracket 30 is supported by hand to rotate around the horizontal axis shown as the axis B in FIG. 1. Since the auxiliary bracket 30 is hinged to the end of the crossbeam 20 exposed to the interval gap 13, then the auxiliary bracket 30 is rotated around the axis B and is close to or away from the plate 12, to form a required angle between the auxiliary bracket 30 and the plate 12. After the required angle is adjusted, the sliding member 42 is locked by the locking member 422, so that the sliding member 42 is fixed on the auxiliary bracket 30 to avoid sliding on the auxiliary bracket 30. In other embodiments, the sliding member 42 excludes the locking member 422, the sliding member 42 and the auxiliary bracket 30 are made of magnetic materials, and the sliding member 42 is fixed to the auxiliary bracket 30 through magnetic adsorption.

In some embodiments, the sliding member 42 further includes a sleeve 421 slidably sleeved on a vertical rod or the telescopic auxiliary bracket 30, the sleeve 421 includes a tube part 421a with an opening on one side of the sleeve 421, and tow opposite installation parts 421b provided on an edge of the opening, one of the two installation parts 421b is provided with a threaded hole 421c, the other of two installation parts 421b is provided with an installation through hole, the locking member 422 is configured to be a bolt, one end of the bolt is passed through the installation through hole and threaded to the threaded hole 421c. When the sliding member 42 needs to be fixed on the auxiliary bracket 30, the bolt is passed through the installation through hole and is screwed on the threaded hole 421c, such that the tube part 421a is fixed to the auxiliary bracket 30. In other embodiments, the installation part 421b is provided with an installation through hole, the locking member 422 is configured to be a bolt and a nut, the bolt is successively passed through the installation through hole and is cooperated with the nut, so that the tube part 421a is fixed to the auxiliary bracket 30.

In another embodiment, the sliding member 42 is slidably installed on the crossbeam 20, one end of the support member 41 is hinged to the auxiliary bracket 30, another end of the support member 41 is hinged to the sliding member 42, the locking member 422 may fix the sliding member 42 on the crossbeam 20, the working principle of the embodiment is similar to the first embodiment, but the sliding member 42 is slidably installed on the crossbeam 20, when the angle between the crossbeam 20 and the auxiliary bracket 30 needs to be adjusted, the sliding member 42 maybe slide freely on the crossbeam 20. After the angle is adjusted, the locking member 422 fixes the sliding member 42 on the crossbeam 20 to avoid the sliding member 42 from sliding.

In the above embodiments, there is only one sliding member 42. In another embodiment, there are two sliding members 42, two sliding members 42 are hinged to the two opposite ends of the support member 41 respectively, one sliding member 42 is slidably provided on the crossbeam 20, the other is slidably provided on the auxiliary bracket 30, that is, two sliding members 42 are provided, one sliding member 42 is slidably connected to the auxiliary bracket 30, the other is slidably connected to the crossbeam 20. One end of support member 41 is hinged to one sliding member 42, another end of the support member 41 is hinged to another sliding member 42, every sliding member 42 is provided with a locking member 422 to fix the position of the sliding member 42 on the auxiliary bracket 30, when the angle between the crossbeam 20 and the auxiliary bracket 30 needs to be adjusted, two sliding member 42 may be slid freely on the crossbeam 20 and the auxiliary bracket 30 respectively, after the angle is adjusted, the locking member 422 fix the two sliding members 42 on the crossbeam 20 and the auxiliary bracket 30 to avoid the sliding member 42 from sliding.

In the above embodiments, when in use, the angle adjuster 40 forms a triangle with the crossbeam 20 and the auxiliary bracket 30 through the support member 41, forming a stable fixation structure, when the locking member 422 is loosened, the sliding member 42 maybe slide on the crossbeam 20 and/or the auxiliary bracket 30, so that the support member is adapted to different angles between the crossbeam 20 and the auxiliary bracket 30. After the angle between the crossbeam 20 and the auxiliary bracket 30 is adjusted, the locking member 422 is locked, to form the stable support. Meanwhile, a broad angle-adjusting range of the angle adjuster 40 enables the auxiliary bracket 30 to be folded on the stand platform 10, which reduces the space consumption of the product in the height direction, and is beneficial for the user to carry or store the rotatable-shooting live-streaming platform.

In some embodiments, a hinge hole 421d is provided at an end of each installation part 421b of the sleeve 421 close to the support member 41, an end surface of the support member 41 is protruded with a hinge protrusion 411, the hinge protrusion 411 is inserted into an interval between the two installation parts 421b, and is hinged to the hinge hole 421d. Then the axis of the sleeve 421 and the axis of the auxiliary bracket 30 are the same one, however, the axis of the support member 41 is intersected with the axis of the auxiliary bracket 30, thus when the angle between the auxiliary bracket 30 and the crossbeam 20 needs to be adjusted, the sliding member 42 needs to be rotatably connected to the support member 41, so that the hinge protrusion 411 is inserted into the hinge hole 421d and is hinged to the installation part 421b, so that the sliding member 42 is rotatable relative to the support member 41. In another embodiment, a fixed pulley is provided on the tube part 421a, a collar is provided on an end surface of the support member 41, the collar may be rotatably connected to the fixed pulley.

In some embodiments, the crossbeam 20 is provided with an installation groove 21, and an end of the support member 41 is inserted into the installation groove 21 and is hinged to two side walls of the installation groove 21. The installation groove 21 is configured to be connected to the end of the support member 41. In other embodiments, an installation protrusion is provided on the crossbeam 20, a connection hole is provided on the installation protrusion. The end of the support member 41 is provided with an avoidance through hole and a connection rod provided at two sides of the avoidance through hole, the installation protrusion is inserted into the avoidance through hole and is hinged to the connection rod.

In some embodiments, the end of the auxiliary bracket 30 is inserted into the installation groove 21, and is hinged to the two side walls of the installation groove 21. The installation groove 21 is also configured to be connected to the end of the auxiliary bracket 30. In other embodiments, the crossbeam 20 is provided with the installation protrusion. the installation protrusion is provided with a connection hole, the end of the auxiliary bracket 30 is provided with the avoidance through hole and the connection rod provided at two sides of the avoidance through hole, the installation protrusion is inserted into the avoidance through hole and is hinged to the connection rod.

In some embodiments, the crossbeam 20 includes two parallel cross-rods 22, and an installation base 23 provided above the cross-rod 22, the installation base 23 is connected to one end of each of the two cross-rods 22, the installation groove 21 is provided on the installation base 23. The installation base 23 is provided with two support points, so that the auxiliary bracket 30 may be more stably connected to the stand platform 10 through the crossbeam 20. In other embodiments, one crossbeam 20 is provided.

In some embodiments, the crossbeam 20 further includes a ring rod 24, the ring rod 24 is connected to another end of each of the two cross-rods 22, and the ring rod 24 is provided around the outer peripheral surface of the shaft 111 of the stand platform 10. The shaft 111 is rotated relative to the plate 12, to drive the ring rod 24 and the cross-rod 22 connected to the ring rod 24 to rotate, to drive the auxiliary bracket 30 to rotate around the plate 12. In particular, the end of the ring rod 24 is provided with an insertion groove for inserting the cross-rod 22, so that the ring rod 24 is detachably connected to the cross-rod 22, and the cross-rod 22 can move in the insertion groove to adjust the distance between the auxiliary bracket 30 and the plate 12, a plurality of piercing holes are provided at intervals along the extension direction of the cross-rod 22, and internal threads are provided in the piercing holes for screwing bolts, so that the tightening bolts abut against the cross-rod 22, and then the ring rod 24 and the cross-rod 22 are relatively fixed. In other embodiments, the ring rod 24 is fixedly connected to the cross-rod 22.

In some embodiments, the outer peripheral edge of the base 11 is exposed on the stand platform 10, the rotatable-shooting live-streaming platform further includes an annular light strip 112, and the annular light strip 112 are provided on the outer peripheral edge of the base 11. Supplementing light from a periphery of the plate 12 to the items or models on the plate 12 may improve the user's use atmosphere experience, mobilize the user's excitement in use, and improve the aesthetic when using the shooting equipment to photograph. In other embodiments, the annular light strip 112 may not be provided.

In some embodiments, the auxiliary bracket 30 is configured to be a telescopic rod, which may adjust the height of the shooting equipment or the supplementary light on the auxiliary bracket 30 from the plate 12 to adapt to the different height of different items placed on the plate 12, which betters the live-streaming effect.

In some embodiments, the equipment-installation structure includes a ring base 31 provided on the top of the auxiliary bracket 30, and the ring base 31 can be used for installing an annular supplementary light, so that the light shine on the items or models on the plate 12. Meanwhile, the top of the auxiliary bracket 30 also includes a shelf for placing the shooting equipment, so that the shooting equipment can always face to the supplementary light, which is beneficial to the shooting equipment to shoot the clear and beautiful images. In other embodiments, no ring base 31 is provided on the top of the auxiliary bracket 30.

The above are only some embodiments of the present disclosure, and do not limit the scope of the present disclosure. Under the inventive concept of the present disclosure, equivalent structural transformations made according to the description and drawings of the present disclosure, or direct/indirect application in other related technical fields are included in the scope of the present disclosure.

What is claimed is:

1. A rotatable-shooting live-streaming platform, comprising:
   a stand platform comprising a base and a plate provided above the base; and
   a bracket assembly comprising an auxiliary bracket, wherein the auxiliary bracket is rotatably connected to the stand platform around a vertical axis, and the auxiliary bracket is provided with an equipment-installation structure for installing a supplementary light and/or a shooting equipment;

the bracket assembly further comprises an angle adjuster and a crossbeam, the crossbeam is rotatably connected to the stand platform around the vertical axis, the auxiliary bracket is connected to an end of the crossbeam away from the base, the auxiliary bracket is rotatably connected to the crossbeam around a horizontal axis, and the angle adjuster is configured to adjust an angle between the auxiliary bracket and the crossbeam;

the angle adjuster comprises a support member, and a sliding member hinged to the support member, the crossbeam is hinged to the auxiliary bracket, the support member is provided on a side of the auxiliary bracket close to the plate and is rotatable relative to the crossbeam and the auxiliary bracket, and the sliding member is slidable on the crossbeam and/or the auxiliary bracket to adjust the angle between the auxiliary bracket and the crossbeam; and the crossbeam is provided with an installation groove, an end of the support member is inserted into the installation groove and is hinged to two side walls of the installation groove; and an end of the auxiliary bracket is inserted into the installation groove and is hinged to the two side walls of the installation groove.

2. The rotatable-shooting live-streaming platform of claim 1, in response to that the angle adjuster comprises two sliding members, the two sliding members are hinged to two opposite ends of the support member respectively, one of the two sliding members is provided on the crossbeam, and the other of two sliding members is provided on the auxiliary bracket.

3. The rotatable-shooting live-streaming platform of claim 2, wherein the sleeve comprises a tube part with an opening on a side of the tube part, and two opposite installation parts provided on an edge of the opening, one of the two installation parts is provided with a threaded hole, the other of two installation parts is provided with an installation through hole, the locking member is configured to be a bolt, and one end of the bolt is passed through the installation through hole and threaded to the threaded hole.

4. The rotatable-shooting live-streaming platform of claim 3, wherein a hinge hole is provided at an end of each installation part close to the support member, an end surface of the support member is protruded with a hinge protrusion, the hinge protrusion is inserted into an interval between the two installation parts and is hinged to the hinge hole.

5. The rotatable-shooting live-streaming platform of claim 1, wherein the sliding member is hinged to an end of the support member and is slidably provided on one of the crossbeams and the auxiliary bracket, another end of the support member is hinged to the other of the crossbeams and the auxiliary bracket.

6. The rotatable-shooting live-streaming platform of claim 1, wherein the sliding member comprises a sleeve and a locking member, the sleeve is slidably sleeved on the auxiliary bracket and/or the crossbeam, the locking member is configured to fix the sleeve relative to the auxiliary bracket.

7. The rotatable-shooting live-streaming platform of claim 1, wherein the crossbeam comprises two parallel cross-rods and an installation base provided on the two cross-rods, the installation base is connected to one end of each of the two cross-rods, the installation groove is provided on the installation base.

* * * * *